US005138450A

United States Patent [19]

Fukuda et al.

[11] Patent Number: 5,138,450

[45] Date of Patent: Aug. 11, 1992

[54] HIGH DENSITY CHARACTER AND/OR FIGURE DISPLAYING APPARATUS

[75] Inventors: Shin Fukuda, Hirakata; Ken Sakamoto, Takatsuki; Toyoaki Unemura, Itami; Tomoji Kondo, Takatsuki; Takashi Yamaguchi, Ibaraki, all of Japan

[73] Assignee: Matsushita Electric Industrial Co., Ltd., Osaka, Japan

[21] Appl. No.: 524,727

[22] Filed: May 17, 1990

[30] Foreign Application Priority Data

May 23, 1989 [JP] Japan ................................ 01-129629

[51] Int. Cl.[5] ................................ H04N 7/08

[52] U.S. Cl. ................................ 358/147; 358/142; 358/183

[58] Field of Search ................ 358/142, 146, 147, 22, 358/183, 180; 340/731

[56] References Cited

U.S. PATENT DOCUMENTS 3,599,178 8/1971 Jackson .

5,008,750 4/1991 Gomikawa ........................ 358/147

5,036,394 7/1991 Morii et al. .................... 358/147 X

FOREIGN PATENT DOCUMENTS 0300509 1/1989 European Pat. Off. .

*Primary Examiner*—Victor R. Kostak

*Attorney, Agent, or Firm*—Stevens, Davis, Miller & Mosher

[57] ABSTRACT

A display apparatus capable of displaying, by use of an ordinary television set function, character/figure information having a higher display density than standard chemistry character figure information. The apparatus includes a first reducing device for reducing into a pixel a partition having vertical and horizontal lengths respectively twice the vertical and horizontal lengths of a smallest pixel zone associated with a dot pattern signal, character generators and a second reducing device for producing a reduced character pattern associated with character codes in a received signal, and a third reducing device for reducing into a block a partition having vertical and horizontal lengths respectively twice the vertical and horizontal lengths of an attribute data specification block specifying a character/figure display attribute in the signal. The reduced character/figure image signals of the entire screen information obtained through the constituent components above are displayed via a display processing circuit. In a display area appropriately selected by the user, a partial image can be displayed in a specified display density.

4 Claims, 8 Drawing Sheets

FIG. 6

| | | | | | | | |
|---|---|---|---|---|---|---|---|
| あ | い | う | え | お | ア | イ | ウ |
| か | き | く | け | こ | カ | キ | ク |
| さ | し | す | せ | そ | サ | シ | ス |
| た | ち | つ | て | と | タ | チ | ツ |
| な | に | ぬ | ね | の | ナ | ニ | ヌ |
| は | ひ | ふ | へ | ほ | ハ | ヒ | フ |
| ま | み | む | め | も | マ | ミ | ム |
| や | い | ゆ | え | よ | ヤ | イ | ユ |

HIGH DENSITY CHARACTER AND/OR FIGURE DISPLAYING APPARATUS

BACKGROUND OF THE INVENTION

The present invention relates to a character and/or figure displaying apparatus for receiving character/figure information signals to decode the received signals and for displaying the character/figure information on a display section.

As one of the various multiplex television broadcasting systems recently devised to efficiently utilize the television broadcasting waves, a multiplex television character broadcasting system has been put to practice in which character/figure information signals of news, weather forecast, stock market quotations, etc. consisting of characters and figures can be displayed on television receivers in households.

In addition to this, videotex systems such as CAPTAIN have also been put to use in which character/figure information signals are transmitted through the telephone lines and displayed on television sets.

Referring next to the drawings, a description will be given of a character and/or figure information displaying or display apparatus capable of receiving the character/figure information signals discussed above to display the information on a screen of a television set.

FIG. 1 is a block diagram showing the configuration of a conventional character/figure information display apparatus. This system comprises a character/figure information decoder section 1 for decoding the character/figure information signals into character/figure image signals associated with the characters and figures, a microprocessor circuit 2 for controlling the character/figure information decoder section 1, a receiver circuit 3 for detecting the character/figure information signals in a form of the digital data signals from the composite video signals, a random access memory (RAM) 4 as an area for storing therein the received character/figure information signals and as a work area of the microprocessor circuit 2, a read-only memory (ROM) 5 for storing therein programs to control the microprocessor circuit 2, a display memory 7 for storing therein the character/figure image signals decoded by the microprocessor circuit 2, a display processing circuit 6 for processing the character/figure image signals stored in the display memory 7 to compose RGB signals, a character/figure generator 9 disposed to decode the character figure information signals into the image signals, a supplemental sound decoder 8 for processing supplemental sound data signals included in the character/figure information signals, and a key pad 10 for supplying the character/figure information decoder section 1 with instructions such as a selection for the character/figure information signals. The configuration of FIG. 1 further includes a television signal receiver section 20, an antenna 21, a television signal receiver circuit 22, an audio demodulator/amplifier circuit 23, and a luminance amplifier/color demodulator circuit 24 for detecting the video signals from the composite video signals. Moreover, the apparatus comprises a video/audio switch circuit 25 for achieving a change over between a combination of the video and audio signals produced from the television signals receiver circuit 22 and a combination of the RGB signals and the supplemental sound signal produced from the character/figure information decoder section 1, an audio amplifier output circuit 26, a speaker 28, a video amplifier output circuit 27, and a display section 29 for displaying thereon a visual image.

Next, a description will be given of the operation of the character/figure information display apparatus configured as above.

An RF television signal received by the antenna 21 is decoded by the television signal receiver circuit 22 of the television signal receiver section 20, thereby acquiring a composite video signal and an audio signal. The composite video signal is sent to the receiver circuit 3 of the character/figure information decoder section 1 so as to obtain a character/figure information signal therefrom. By use of the key pad 10, the user can supply the microprocessor circuit 2 with an indication to select desired items from the various character/figure information items. The microprocessor circuit 2 then selects a character/figure information signal associated with the information specified from the key pad 10 to store the signal in the RAM 4. Furthermore, the microprocessor circuit 2 decodes the character/figure information signal according to contents of the programs stored in the ROM 5 by appropriately using the character generator 9 when necessary. The character/figure image signal thus decoded from the character/figure information signal is loaded in the display memory 7. The signal stored in the display memory 7 is acquired by the display processing circuit 6, which produces therefrom the RGB signals. The supplemental sound data included in the character/figure information signal is transformed into a supplemental sound signal by the supplemental sound decoder 8.

The audio signal and the composite video signal demodulated by the television receiver circuit 22 are respectively fed to the audio demodulator/amplifier circuit 23 and the luminance amplifier/color demodulator circuit 24. Resultant signals are delivered to the video/audio switch circuit 25. When displaying a character/figure image, the switching circuit 25 selects a combination of the RGB signals and the supplemental second signal from the decodes section 1, while displaying a television image, a combination of the video and audio signals from the television receiver circuit 22 is selected. The selected signals are respectively passed via the audio amplifier output circuit 26 and the video amplifier output circuit 27 to the speaker 28 and the display section 29, respectively. Through the operations above, the character/figure information selected by the user can be displayed on the display section 29.

However, in the character/figure information display apparatus, the image which can be displayed on the display section is limited to character/figure information having a display density equivalent to a scan period of the television signal (associated with level A in the multiplex television character broadcasting and with ranks 1, 2, and 4 in the CAPTAIN system). In a case where character/figure information having a higher display density (associated with level B in the multiplex television character broadcasting and with ranks 3 and 5 in the CAPTAIN system) is to be displayed, the display capability is required to be increased in the display section including the display equipment such as a cathode ray tube (CRT) and hence the system cost is considerably increased.

SUMMARY OF THE INVENTION

It is therefore an object of the present invention to provide a character/figure display apparatus capable of displaying character/figure information with a higher display density by use of an ordinary television receiver function, thereby removing the problem discussed above.

In order to achieve the above object the character/figure information display apparatus according to the present invention comprises a receiver circuit for receiving a character/figure information signal including a display control information signal, a display memory for storing therein a character/figure image signal attained by decoding the character/figure information signal, first decode means for decoding the received character/figure information signal into a character/figure image signal having a display density different from a display density specified by the display control information signal and for storing the resultant signal in said display memory, second decode means for decoding a portion of the character/figure information signal into a character/figure image signal having a display density specified by the display control information signal and for storing the resultant signal in said display memory, a display processing circuit for displaying the character/figure image signals on a display section, and display switch means for achieving a change-over operation between the character/figure image signal decoded by said first decode means and the character/figure image signal decoded by said second decode means for a display thereof.

The first decode means includes first reduce means for selecting from a pattern data signal representing a figure by use of dots from the character/figure information signal to make a logical sum of respective pixels of a square partition having vertical and horizontal lengths respectively equal to twice the vertical and horizontal lengths of a smallest pixel, thereby reducing the pixels into one pixel; a first character generator for producing a pattern associated with character codes in the character/figure information signal, a second character generator for generating a reduced pattern associated with the character codes, second reduce means responsive to an output from said second character generator to display a reduced character/figure image, and third reduce means for processing the character/figure information signal to select, from attribute data items associated with the respective blocks having vertical and horizontal lengths respectively equal to twice the vertical and horizontal lengths of a smallest specification unit of attribute data specifying a character/figure display attribute, attribute data items most frequently appearing therein, thereby reducing the blocks to one block.

The display switch means includes area display means in which the second decode means can display an image in a display screen presented by the first decode means and a buffer memory for storing therein the received character/figure information signal. The character/figure information signal stored in the buffer memory is decoded by the first or second decode means for a display thereof, thereby changing over the display of the character/figure image.

In the constitution above, the character/figure information which is received by the receiver circuit and which has a higher display density (associated with level B in the multiplex television character broadcasting and with ranks 3 and 5 in the CAPTAIN system) is decoded by the first decode means having the first, second and third reduce means to be a reduced character/figure image signal, which is then loaded in the display memory. The display processing circuit reads the content from the display memory to display the entire screen information.

Owing to this configuration, it is possible to display an area on the display screen in which the second decode means can display an image. The area can be selected such that the second decode means processes the character/figure image signal stored in the buffer memory to decode a portion thereof associated with the selected area to a character/figure image with a specified display density, thereby storing the decoded result in the display memory. This enables the display processing circuit to read the content of the display memory and to display the content without reducing the size thereof.

According to the constitution embodying the present invention as described above, by use of the display section having a display capability to display signals stipulated in level A of the multiplex character broadcasting, a character/figure image with a higher display density can be displayed in accordance with level B of the multiplex character broadcasting. Moreover, a portion of the display image can be displayed with a specified display density when required. In consequence, there are developed remarkable advantageous features.

BRIEF DESCRIPTION OF THE DRAWINGS

These and other objects and advantages of the present invention will become apparent by reference to the following description and accompanying drawings wherein:

FIG. 6 is a diagram illustratively showing a display image example obtained by the first decode means through an operation to decode character/figure information of the multiplex character broadcasting level B.

DESCRIPTION OF THE PREFERRED EMBODIMENTS

Figure 2:
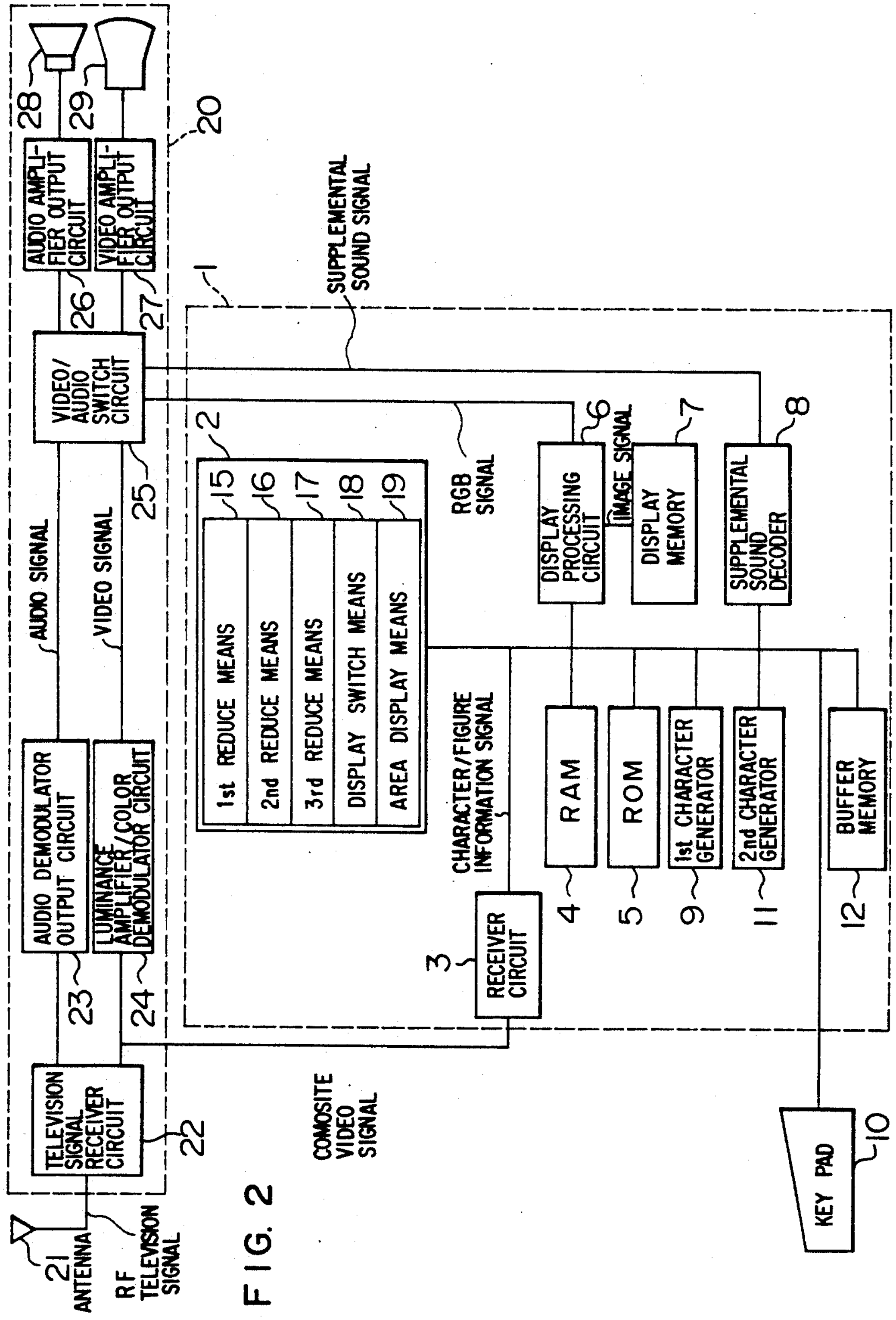
FIG. 2 is a block diagram schematically showing a character/figure information display apparatus as an embodiment according to the present invention.

Referring now to the drawings, a description will be given of an embodiment of a character/figure information display apparatus in accordance with the present invention. FIG. 2 is a block diagram showing the configuration of a character/figure information display apparatus as an embodiment according to the present invention.

The system of FIG. 2 includes a character/figure information decoder section 1 for decoding a character/figure information signal into a character/figure image signal, a first character generator 9 having a function identical to the function of a conventional character generator, a second character generator 11 for producing a reduced pattern, a microprocessor circuit 2 comprising first and second decode means including first reduce means 15, second reduce means 16, and third reduce means 17, display switch means 18, and area display means 19, and a display processing circuit 6 which reads and processes contents of a display memory 7 to achieve an image composition such that for a portion where a character/figure image signal is stored, the character/figure image signal is displayed and that for a portion where a character/figure image signal is missing, a television image signal is displayed. The system further includes RAM 4, A ROM 5, a supplemental sound decoder 8, a key pad 10, a buffer memory 12 for storing therein the received character/figure information signal, a television signal receiver section 20, an antenna 21, a television signal receiver circuit 22, an audio demodulator/amplifier circuit 23, a luminance amplifier/color demodulator circuit 24, a video/audio switch circuit 25, an audio amplifier output circuit 26, a video amplifier output circuit 27, a speaker 28, and a display section 29.

Figure 1:
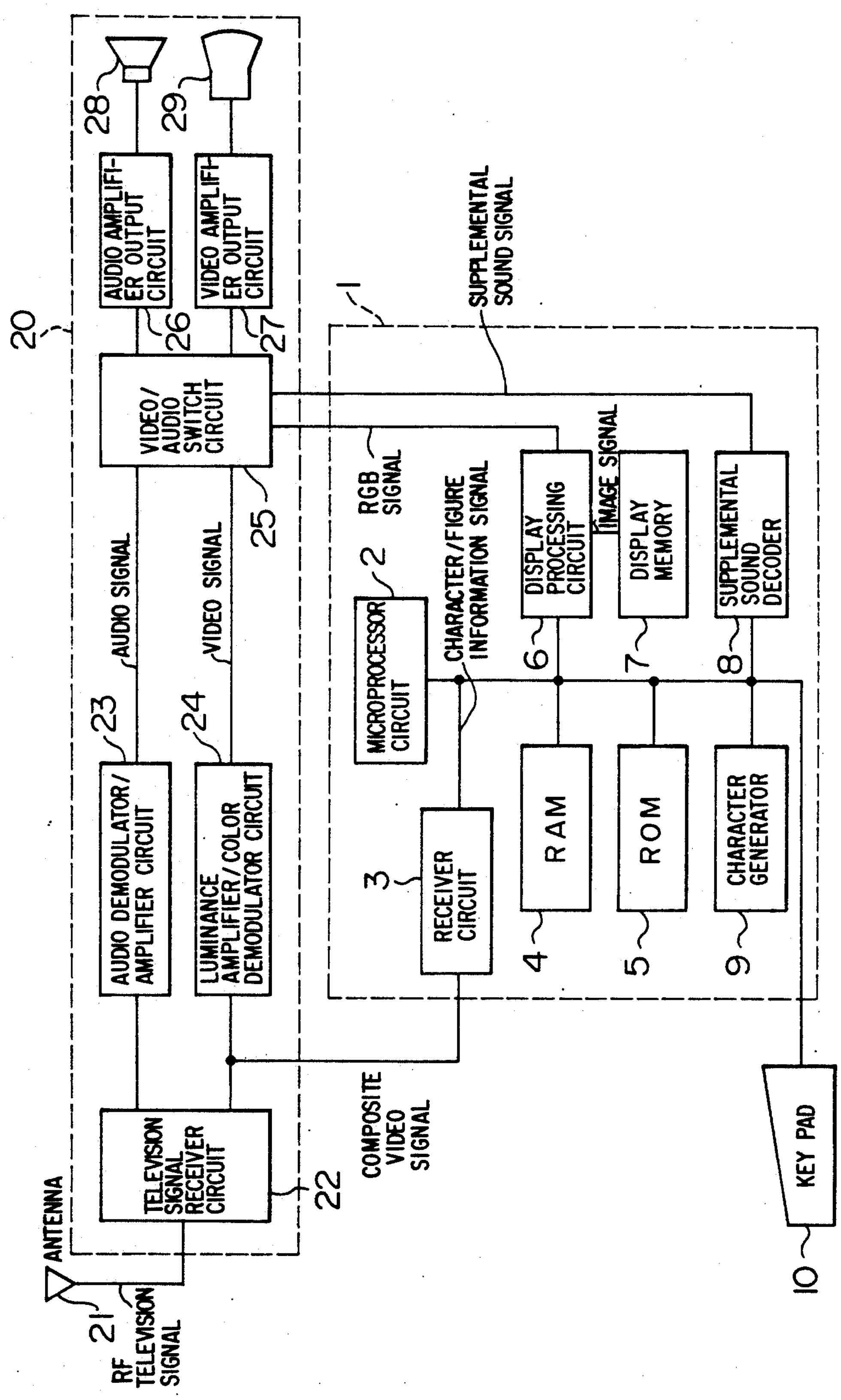
FIG. 1 PRIOR ART
FIG. 1 is a functional block diagram schematically showing the constitution of an example of a conventional character/figure information display apparatus.
Figure 3:
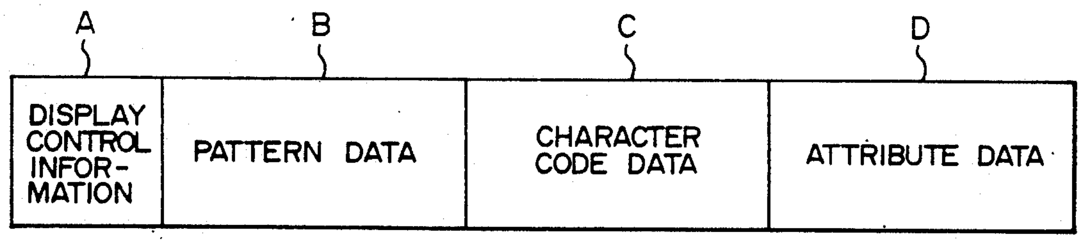
FIG. 3 is a schematic diagram showing the format of character/figure information.

Next, a description will be given of the operation of the character/figure information display apparatus thus configured. Basically, this apparatus conducts the same operation as the system of FIG. 1. FIG. 3 is an example of the format of the character/figure information signal, which includes display control information A specifying a display density of character/figure information, pattern data B to display a figure with dots, character code data C used for a conversion of a predetermined pattern by means of a character generator of the character/figure information display apparatus, and attribute data D specifying a display attribute of the character/figure. A description will be next given of a case as an example in which the character/figure information signal is received by the apparatus.

When character/figure information selected by the user from the key pad 10 is related to a character/figure information signal including the display control information A specifying a display density associated with level B, the first decode means is employed to decode the signal.

Figure 4B:
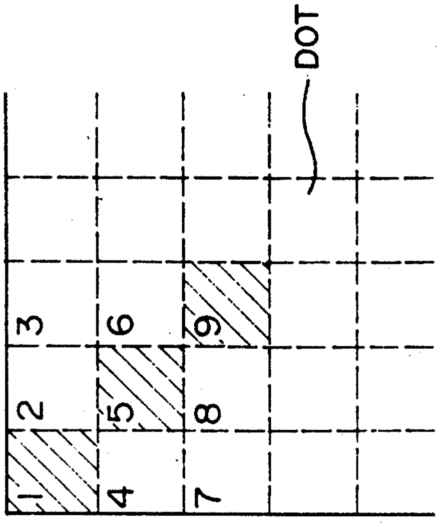
FIGS. 4*a* and 4*b* are conceptual diagrams useful to explain a reduction method employed in the first reduce means.
Figure 4A:
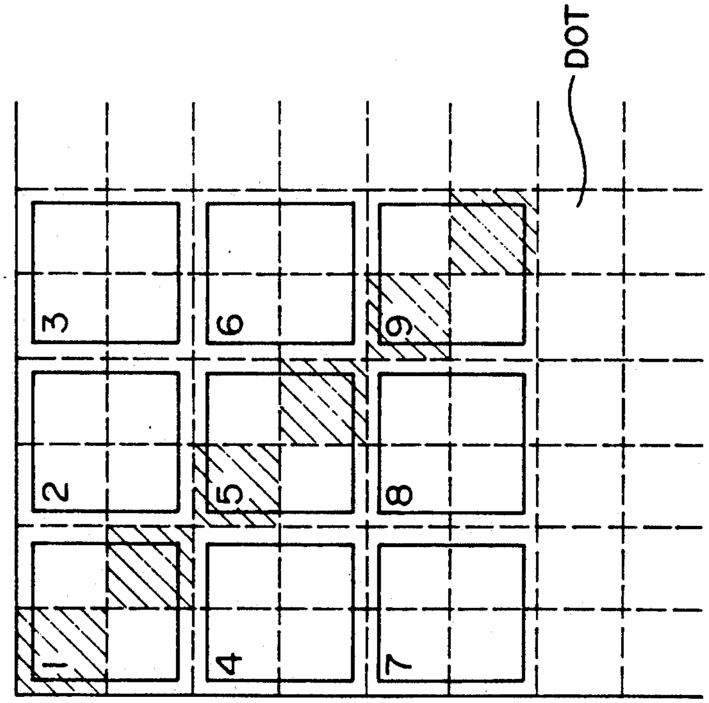

FIGS. 4(*a*) and 4(*b*) show a method adopted by the first reduce means to reduce the pattern data B. In this description, it is assumed that the number of vertical pixels (ml) of the smallest pixel block is "2" and that pattern data having a horizontal pixel count (m2) set to "2" is reduced to an image having a pixel count (m3)="1".

In FIG. 4(*a*), for four dots of a partition 1 before the reduction, the system conducts logical sum operations between the respective dots. In the partition 1, two dot zones (shadow portions in these diagrams) are assigned with respective dots, whereas two remaining dot zones are free from dots. The result of the logical sum operations indicates "presence of a dot" and hence this partition 1 is reduced to a partition 1 associated with a dot as shown in FIG. 4(*b*). The operation above is similarly accomplished for all partitions to reduce the pattern data B.

Figure 5B:
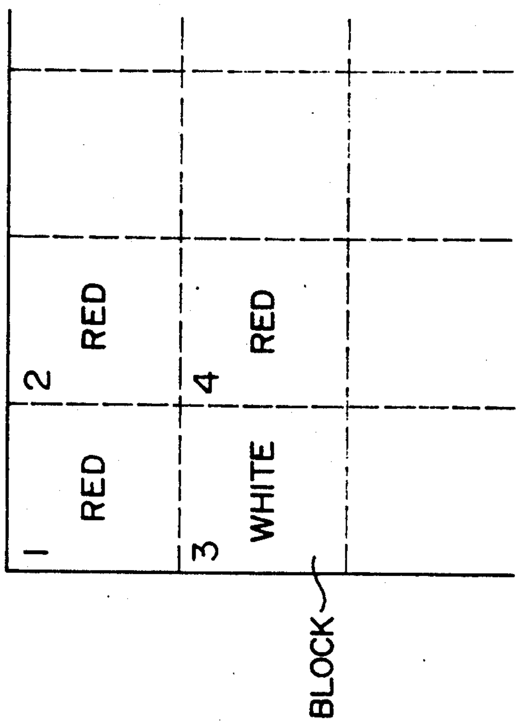
FIGS. 5*a* and 5*b* are conceptual diagrams for explaining a reduction method employed in the second reduce means.
Figure 5A:
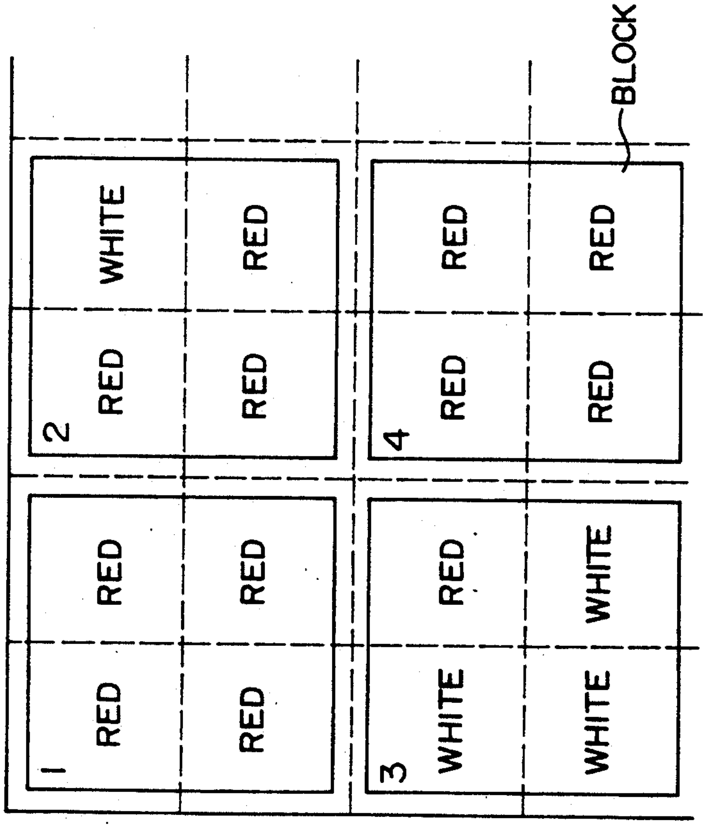

The character code data C is disposed for the reduction to be employed by the second reduce means 16 to produce a reduced pattern by use of the second character generator 11. FIGS. 5(*a*) and 5(*b*) show a method adopted by the third reduce means 17 to reduce attribute data. It is assumed here that the number of vertical pixels (n1) of the smallest block is "2" and that data having a horizontal pixel count (n2) set to "2" is reduced to a block having a pixel count (n3) equal to "1".

The system selects attribute data items most frequently appearing in the attribute data items of the respective sub-partitions of the partition 1 before reduction shown in FIG. 5(*a*). In the partition 1, since four blocks are red, the reduced block is also assigned with red. The similar processing is carried out for all partitions for the pattern reduction. When a partition includes two pairs of sub-partitions of the respectively same attribute data, either one of the attributes is selected depending on the attribute of the adjacent partition. The reduced character/figure image signal thus reduced is loaded in the display memory 7. The signal is then read therefrom by the display processing circuit 6, which thereby presents the entire screen information on the display section 29.

Furthermore, in the display state discussed above, when an input is supplied from the key pad 10, the area display means 19 stores in the display memory 7 codes indicating an area in which an image can be displayed with a display density specified by the display control information A within a range of the display capability of the display section 29. The stored codes are obtained by the display processing circuit 6 to be displayed on the display section 29. In this embodiment, the area is set to have vertical and horizontal lengths each respectively being half the vertical and horizontal lengths of the entire display screen. Incidentally, it is natural that a display position indicating the area can be arbitrarily moved in the vertical and horizontal directions by an input from the key pad 10.

Next, in this display state, when an input is supplied from the key pad 10 such that the second decode means processes the character/figure information signal stored in the buffer memory to decode a portion thereof associated with the area specified on the screen and to store the decoded signal in the display memory 7, the obtained signal is thereafter displayed on the display control information.

Figure 7:
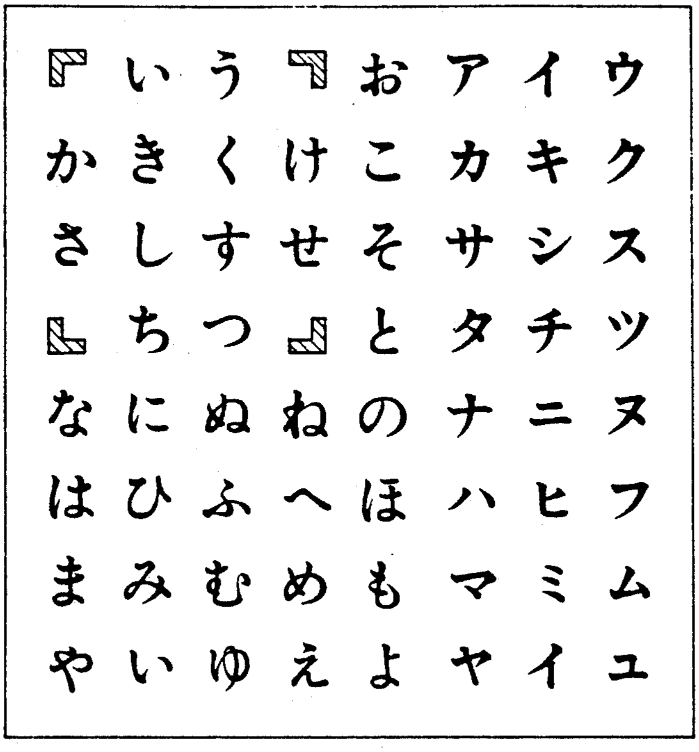
FIG. 7 is a schematic diagram showing a display image example including a frame denoting an area of the display image shown in FIG. 6, the frame being available to display therein an image with a specified display density.
Figure 8:
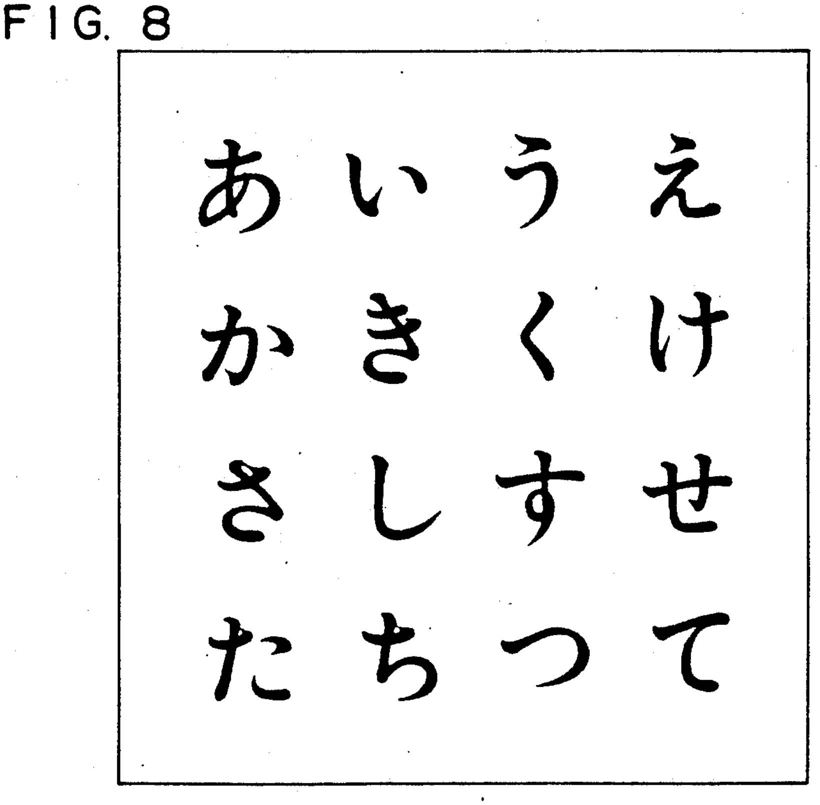
FIG. 8 is a diagram showing a display image example presented with a specified display density.

FIG. 6 shows a character/figure image obtained by the first decode means through an operation to decode character/figure information of the level B specification. FIG. 7 is a display image in which the specified area is presented by the area display means 19. FIG. 8 shows an image of a portion of the level-B character/figure information displayed in the specified display density by the second decode means.

Figure 9:
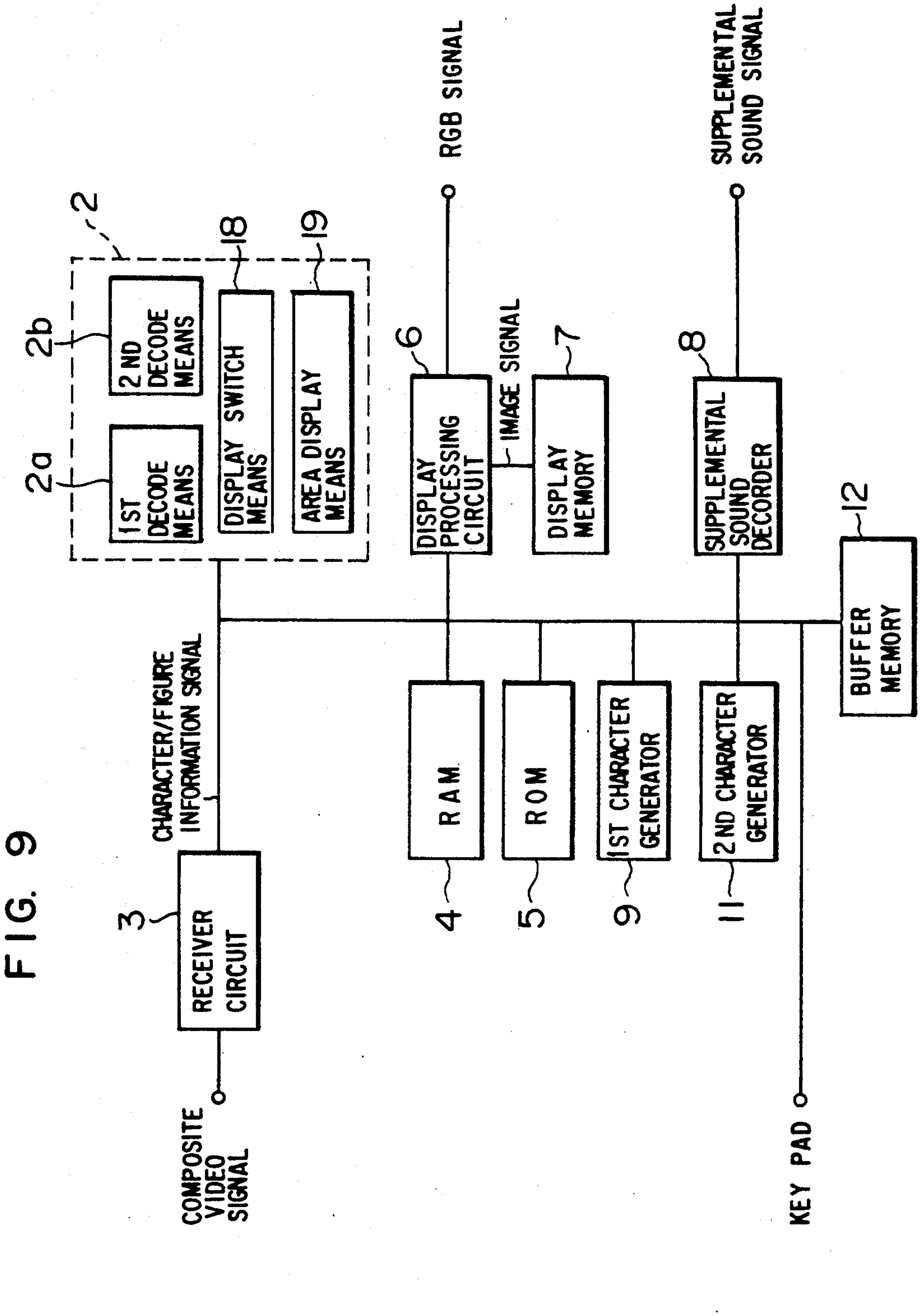
FIG. 9 is a block diagram schematically showing a construction of the character/figure information decoder section.

According to the embodiment as described above and shown in FIG. 9, there are disposed the microprocessor circuit 2 comprising the first and second decode means 2*a* and 2*b* including the first reduce means 15, the second reduce means 16, and the third reduce means 17, a display switch means 18, and an area display means 19, a second character generator 11 producing a reduced pattern, and a buffer memory 12. Consequently, the display section having a display capability to display a screen associated with a signal stipulated as level A of the multiplex character broadcasting can display a screen of a signal of level B of the multiplex character broadcasting. Furthermore, a portion of the screen may be presented in a specified density.

Incidentally, the embodiment has been described by use of the multiplex character broadcasting as an example; however, the similar operations can naturally e achieved in association with videotex systems such as the CAPTAIN system.

By embodying the present invention as described above, the display section having a display capability to display a signal stipulated as level A of the multiplex character broadcasting can display a screen of a signal of level B of the multiplex character broadcasting. Moreover, when necessary, a portion of the displayed image may be presented in a specified density. The present invention is therefore quite advantageous in practice.

While particular embodiments of the invention have been shown and described, it will be obvious to those skilled in the art that various changes and modifications may be made without departing from the present invention in its broader aspects.

We claim:

1. A character/figure information display apparatus comprising:

a receiver circuit for receiving a character/figure information signal including a display control information signal;

a display memory for storing therein a character/figure image signal obtained through a decoding operation conducted on the character/figure information signal;

first decode means for decoding the received character/figure information signal into a character/figure image signal having a display density different from a display density specified by the display control information signal when a memory capacity necessary for displaying the character/figure signal in the specified display density exceeds a storage capacity of said display memory and for loading said display memory with the decoded character/figure image signal;

second decode means for decoding a portion of the received character/figure information signal into a character/figure image signal having the display density specified by the display control information signal when a memory capacity necessary for displaying a storage character/figure signal in the specified display density exceeds a storage capacity of said display memory and for loading the decoded character/figure image signal in said display memory;

a display processing circuit for displaying the character/figure image signals stored in the display memory on a display section; and display switch means for achieving a change-over operation between the character/figure image signal decoded by said first decode means and the character/figure image signal decoded by said second decode means and for outputting the selected signal.

2. An apparatus according to claim 1 further comprising:

first reduce means for processing a pattern data signal of the character/figure information signal, said pattern data signal representing a figure with dots, and for achieving a logical sum operation between respective pixels of each partition of a smallest pixel block associated with the pattern data signal, said partition having a vertical length of m1 pixels and a horizontal length of m2 pixels, thereby reducing the partition into m3 pixels;

second reduce means including a first character generator for producing a pattern associated with character codes in the character/figure information signal and a second character generator for generating a reduced pattern associated with the character codes, said second reduce mans being responsive to an output from said second character generator to display a reduced character/figure image; and third reduce means for processing pattern data items specifying character/figure display attributes in the character/figure information signal and for selecting, from pattern data times of each block of a partition as a smallest specification unit of pattern data, said partition having a vertical length of n1 blocks and a horizontal length of n2 blocks, an attribute data item most frequently appearing therein, thereby reducing the partition into n3 blocks.

3. An apparatus according to claim 1 further comprising area display means for displaying an area in a display screen presented by said first decode means, said area being available for the second decode means to display therein an image.

4. An apparatus according to claim 1 further comprising a buffer memory for storing therein a received character/figure information signal, said first and second decode means decoding the character/figure information signal stored in the buffer memory to display the decoded signal, thereby achieving a changing-over between character/figure images thus displayed.

* * * * *